United States Patent
Hosseini et al.

(10) Patent No.: US 11,063,692 B2
(45) Date of Patent: Jul. 13, 2021

(54) ZERO POWER (ZP) CHANNEL STATE INFORMATION REFERENCE SIGNAL (CSI-RS) RATE MATCHING WITH SLOT AGGREGATION

(71) Applicant: QUALCOMM Incorporated, San Diego, CA (US)

(72) Inventors: Seyedkianoush Hosseini, San Diego, CA (US); Alexandros Manolakos, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 24 days.

(21) Appl. No.: 16/531,806

(22) Filed: Aug. 5, 2019

(65) Prior Publication Data
US 2020/0052813 A1    Feb. 13, 2020

(30) Foreign Application Priority Data
Aug. 13, 2018   (GR) ............................ 2018-0100386

(51) Int. Cl.
*H04L 1/00*   (2006.01)
*H04L 5/00*   (2006.01)
(Continued)

(52) U.S. Cl.
CPC .......... *H04L 1/0013* (2013.01); *H04L 1/0026* (2013.01); *H04L 5/0051* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 9,369,253 B2   6/2016   Pourahmadi et al.
9,380,571 B2   6/2016   Park et al.
(Continued)

FOREIGN PATENT DOCUMENTS

WO   2017190273 A1   11/2017
WO   2018031623 A1   2/2018
(Continued)

OTHER PUBLICATIONS

Panasonic: "ZP CSI-RS for PDSCH rate matching", 3GPP Draft: R1-1708216, 3rd Generation Partnership Project (3GPP), Mobile Competence Center, 650 Route Des Lucioles, F-06921, Sophia-Antipolis CEDEX; France, XP051273411, vol. (RAN WG1. No. Hangzhou, 20170-20170519, May 14, 2017 (May 14, 2017) (Year: 2017).*

(Continued)

*Primary Examiner* — Peter G Solinsky
*Assistant Examiner* — Sanjay K Dewan
(74) *Attorney, Agent, or Firm* — Patterson & Sheridan. L.L.P

(57) ABSTRACT

Techniques and apparatus for rate matching physical downlink shared channel (PDSCH) around zero power (ZP) channel state information reference signal (CSI-RS) resources in slot aggregation scenarios are described. In one technique, an indication that triggers a set of ZP CSI-RS resources is received in a first slot of a plurality of aggregated slots. A rate matching behavior for processing a PDSCH transmission received in the first slot and at least a second slot, subsequent to the first slot, of the plurality of aggregated slots is determined. The PDSCH transmission received in the first slot and at least the second slot is processed in accordance with the rate matching behavior.

20 Claims, 10 Drawing Sheets

(51) Int. Cl.
*H04W 72/04* (2009.01)
*H04W 76/27* (2018.01)

(52) U.S. Cl.
CPC ..... *H04W 72/042* (2013.01); *H04W 72/0446* (2013.01); *H04W 76/27* (2018.02)

(58) Field of Classification Search
USPC .......................................................... 370/329
See application file for complete search history.

(56) References Cited

U.S. PATENT DOCUMENTS

| | | | |
|---|---|---|---|
| 9,872,289 B2 | 1/2018 | Chen et al. | |
| 2014/0293944 A1* | 10/2014 | Kim | H04L 5/0023 370/329 |
| 2015/0049704 A1* | 2/2015 | Park | H04L 5/0048 370/329 |
| 2015/0085795 A1* | 3/2015 | Papasakellariou | H04L 5/0044 370/329 |
| 2015/0180625 A1* | 6/2015 | Park | H04W 72/042 370/329 |
| 2015/0249972 A1* | 9/2015 | You | H04L 5/0035 370/254 |
| 2015/0365928 A1* | 12/2015 | Lee | H04L 1/1671 370/329 |
| 2016/0021565 A1* | 1/2016 | Kim | H04J 11/004 370/329 |
| 2016/0127095 A1 | 5/2016 | Chen et al. | |
| 2017/0366377 A1 | 12/2017 | Papasakellariou | |
| 2018/0213477 A1* | 7/2018 | John Wilson | H04W 52/0216 |
| 2019/0116009 A1* | 4/2019 | Yum | H04L 5/00 |
| 2019/0223161 A1* | 7/2019 | Muruganathan | H04L 5/0048 |
| 2019/0312621 A1* | 10/2019 | Nam | H04W 76/27 |
| 2020/0028640 A1* | 1/2020 | Yeo | H04L 5/0051 |
| 2020/0267730 A1* | 8/2020 | Kim | H04W 72/0453 |

FOREIGN PATENT DOCUMENTS

| | | | |
|---|---|---|---|
| WO | WO 2018/031623 A1 * | 2/2018 | |
| WO | 2018063072 A1 | 4/2018 | |
| WO | 2018144920 A1 | 8/2018 | |

OTHER PUBLICATIONS

International Search Report and Written Opinion—PCT/US2019/045289—ISA/EPO—dated Oct. 15, 2019.
Panasonic: "ZP CSI-RS for PDSCH Rate Matching", 3GPP Draft; R1-1708216, 3rd Generation Partnership Project (3GPP), Mobile Competence Centre ; 650, Route Des Lucioles ; F-06921 Sophia-Antipolis Cedex ; France, vol. RAN WG1, No. Hangzhou; May 15, 2017-May 19, 2017, May 14, 2017 (May 14, 2017), XP051273411, 3 Pages, Retrieved from the Internet: URL:http://www.3gpp.org/ftp/Meetings_3GPP_SYNC/RAN1/Docs/ [retrieved on May 14, 2017] section 1-2; p. 1-p. 3.

* cited by examiner

ZERO POWER (ZP) CHANNEL STATE INFORMATION REFERENCE SIGNAL (CSI-RS) RATE MATCHING WITH SLOT AGGREGATION

CROSS-REFERENCE TO RELATED APPLICATION

This application claims the benefit of and priority to Greek Patent Application No. 20180100386, filed Aug. 13, 2018, which is assigned to the assignee hereof and hereby expressly incorporated by reference herein.

BACKGROUND

I. Field of the Disclosure

Aspects of the present disclosure relate to wireless communications, and more particularly, to techniques for rate matching around physical downlink shared channel (PDSCH) transmissions in scenarios with multiple transmit receive points (TRPs).

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving, in a first slot of a plurality of aggregated slots, a first indication in downlink control information (DCI) that triggers a set of zero power (ZP) channel state information reference signal (CSI-RS) resources from multiple sets of ZP CSI-RS resources. The method also includes determining, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots. The method further includes processing the PDSCH transmission received in the first slot and at least the second slot in accordance with the rate matching behavior.

Certain aspects provide an apparatus for wireless communication. The apparatus generally includes means for receiving, in a first slot of a plurality of aggregated slots, a first indication in downlink control information (DCI) that triggers a set of zero power (ZP) channel state information reference signal (CSI-RS) resources from multiple sets of ZP CSI-RS resources. The apparatus also includes means for determining, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots. The apparatus further includes means for processing the PDSCH transmission received in the first slot and at least the second slot in accordance with the rate matching behavior.

Certain aspects provide an apparatus for wireless communication. The apparatus generally includes a receiver, at least one processor, and a memory coupled to the at least one processor. The receiver is configured to receive, in a first slot of a plurality of aggregated slots, a first indication in downlink control information (DCI) that triggers a set of zero power (ZP) channel state information reference signal (CSI-RS) resources. The at least one processor is configured to determine, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots. The at least one processor is also configured to process the PDSCH transmission received in the first slot and at least the second slot in accordance with the rate matching behavior.

Certain aspects provide a computer-readable medium having computer executable code stored thereon for wireless communication by a UE. The computer executable code includes: code for receiving, in a first slot of a plurality of aggregated slots, a first indication in downlink control information (DCI) that triggers a set of zero power (ZP) channel state information reference signal (CSI-RS) resources from multiple sets of ZP CSI-RS resources; code for determining, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots; and code for processing the PDSCH transmission received in the first slot and at least the second slot in accordance with the rate matching behavior.

Certain aspects provide a method for wireless communication by a network entity. The method generally includes determining a rate matching behavior for processing a physical downlink shared channel (PDSCH). The method also includes transmitting, to a user equipment (UE), a first indication via downlink control information (DCI) that triggers a set of zero power (ZP) channel state information reference signal (CSI-RS) resources from multiple sets of ZP CSI-RS resources. The first indication is transmitted in a first slot of a plurality of aggregated slots. The method further includes transmitting the PDSCH in the first slot and at least a second slot, subsequent to the first slot, of the plurality of aggregated slots. The determined rate matching behavior for processing the PDSCH transmitted in the first slot and at least the second slot is based in part on the first indication transmitted in the first slot.

Certain aspects provide an apparatus for wireless communication. The apparatus generally includes means for determining a rate matching behavior for processing a physical downlink shared channel (PDSCH). The apparatus also includes means for transmitting, to a user equipment (UE), a first indication via downlink control information (DCI) that triggers a set of zero power (ZP) channel state information reference signal (CSI-RS) resources from multiple sets of ZP CSI-RS resources. The first indication is transmitted in a first slot of a plurality of aggregated slots. The apparatus further includes means for transmitting the PDSCH in the first slot and at least a second slot, subsequent to the first slot, of the plurality of aggregated slots. The determined rate matching behavior for processing the PDSCH transmitted in the first slot and at least the second slot is based in part on the first indication transmitted in the first slot.

Certain aspects provide an apparatus for wireless communication. The apparatus generally includes a transmitter, at least one processor, and a memory coupled to the at least one processor. The at least one processor is configured to determine a rate matching behavior for processing a physical downlink shared channel (PDSCH). The transmitter is configured to transmit, to a user equipment (UE), a first indication via downlink control information (DCI) that triggers a set of zero power (ZP) channel state information reference signal (CSI-RS) resources from multiple sets of ZP CSI-RS resources. The first indication is transmitted in a first slot of a plurality of aggregated slots. The transmitter is also configured to transmit the PDSCH in the first slot and at least a second slot, subsequent to the first slot, of the plurality of aggregated slots. The determined rate matching behavior for processing the PDSCH transmitted in the first slot and at least the second slot is based in part on the first indication transmitted in the first slot.

Certain aspects provide a computer-readable medium having computer executable code stored thereon for wireless communication by a network entity. The computer executable code includes: code for determining a rate matching behavior for processing a physical downlink shared channel (PDSCH); code for transmitting, to a user equipment (UE), a first indication via downlink control information (DCI) that triggers a set of zero power (ZP) channel state information reference signal (CSI-RS) resources from multiple sets of ZP CSI-RS resources, where the first indication is transmitted in a first slot of a plurality of aggregated slots; and code for transmitting the PDSCH in the first slot and at least a second slot, subsequent to the first slot, of the plurality of aggregated slots, where the determined rate matching behavior for processing the PDSCH transmitted in the first slot and at least the second slot is based in part on the first indication transmitted in the first slot.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
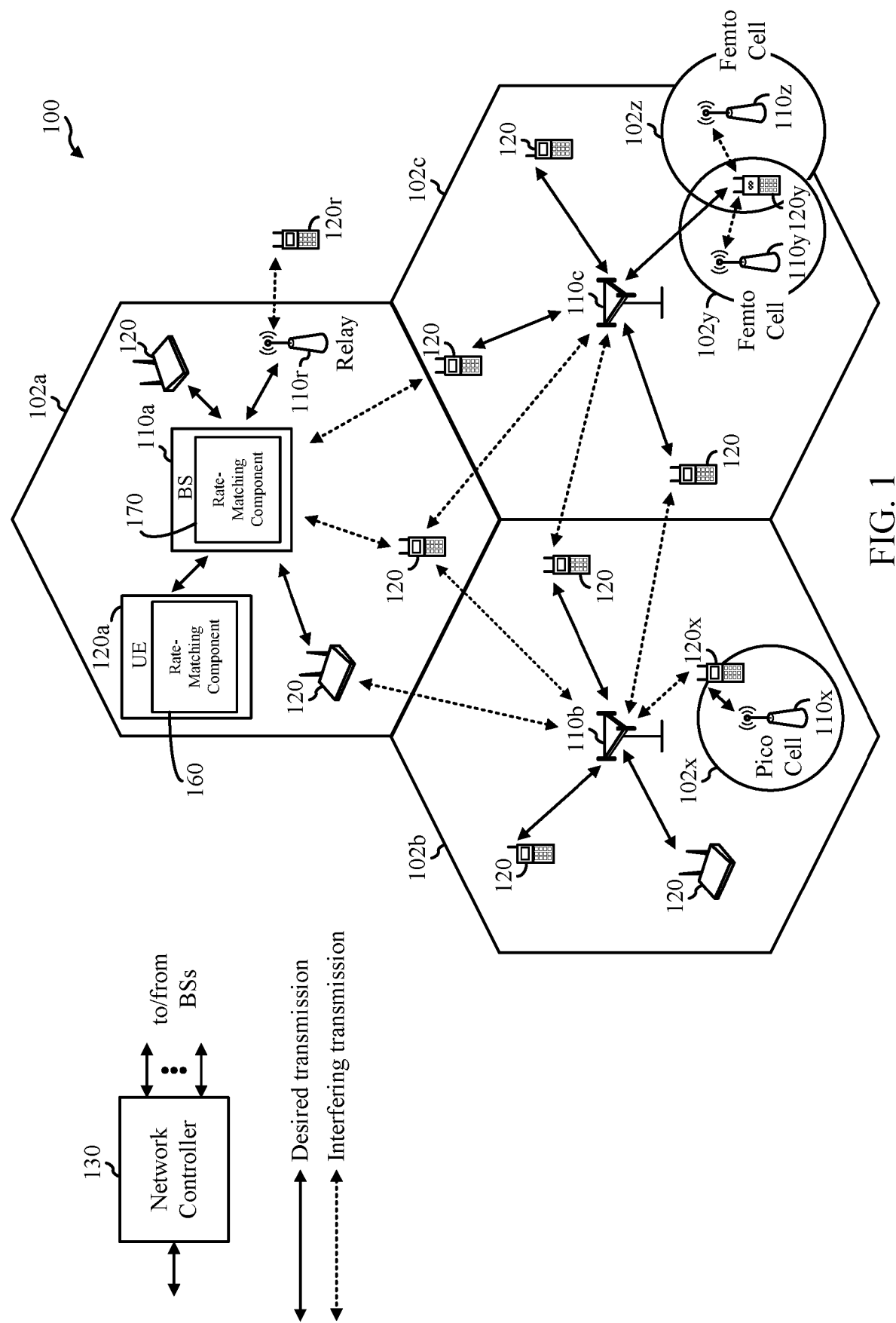
FIG. 1 is a block diagram conceptually illustrating an example telecommunications system, in accordance with certain aspects of the present disclosure.

Aspects of the present disclosure provide apparatus, methods, processing systems, and computer readable mediums for rate matching of zero power (ZP) channel state information reference signal (CSI-RS) resources for physical downlink shared channel (PDSCH) processing in slot aggregation scenarios (e.g., scenarios where the PDSCH pattern is repeated across multiple aggregated slots).

In certain wireless communication systems (e.g., new radio or NR), decoding PDSCH may involve performing rate matching around certain resource elements (REs) indicated as unavailable for PDSCH. One reference example of such REs includes ZP CSI-RSs. For a ZP CSI-RS, the UE may determine that the REs allocated to the ZP CSI-RS(s) are not used for the PDSCH transmission and that the PDSCH is mapped (or rate-matched) around the REs occupied by ZP CSI-RS(s). In NR, the gNB may transmit a downlink control information (DCI) field that triggers a particular ZP CSI-RS resource configuration from multiple ZP CSI-RS resource configurations. However, this approach for triggering ZP CSI-RS can impact decoding of PDSCH in slot aggregation scenarios.

For example, when the UE is configured with slot aggregation (e.g., an aggregation window that includes multiple consecutive slots), the same symbol allocation (for transport block(s) (TB(s)) within PDSCH) may be applied across the aggregation window. In this slot aggregation scenario, the UE may expect that the TB is repeated within each symbol allocation among each of the consecutive slots within the aggregation window. However, when the UE receives the DCI triggering the ZP CSI-RS resource configuration in the initial (first) slot of the aggregation window, the UE may not know which slot(s) of the aggregation window the triggered ZP CSI-RS resource configuration applies to. This ambiguity by the UE may be caused in part by the DCI field that triggers the particular ZP CSI-RS resource configuration not indicating which slot (or multiple slots) the ZP CSI-RS resource configuration applies to, when the resources of the triggered ZP CSI-RS resource configuration are constrained within a given slot.

Thus, in the above scenario where the UE receives the DCI triggering the ZP CSI-RS resource configuration in the first slot of the aggregation window, the UE may not know whether the triggered CSI-RS resource configuration applies to only a single slot (e.g., the first slot, the second slot, the third slot, and so on), a subset of slots of the aggregation window, or all slots of the aggregation window. This UE ambiguity can impact PDSCH processing (or decoding) by the UE. For example, the UE may not know whether and/or how to perform rate matching in each slot of the aggregation window.

Aspects presented herein provide techniques and apparatus for determining a rate matching behavior (e.g., whether to perform rate matching or refrain from performing rate matching) when processing a PDSCH in slot aggregation scenarios (e.g., scenarios where the PDSCH pattern is repeated across multiple consecutive (or aggregated) slots). In particular, aspects enable a gNB and/or UE to determine a PDSCH rate matching behavior for slots of an aggregation window based on a ZP CSI-RS resource configuration triggered by a downlink grant received in an initial (first) slot of the aggregation window.

In some aspects, a UE may receive, in a first (initial) slot of an aggregation window, an indication in DCI that triggers a set of ZP CSI-RS resources from multiple sets of ZP CSI-RS resources. The UE may determine, based on the DCI indication, a rate matching behavior for processing a PDSCH transmission received in the first slot and one or more subsequent slots of the aggregation window. The UE may process the PDSCH transmission received in the first slot and the one or more subsequent slots of the aggregation window, in accordance with the rate matching behavior.

In one aspect, the UE may determine, based on the DCI indication, that the triggered set of ZP CSI-RS resources applies to all slots of the aggregation window. In this case, the UE may determine to rate match around the triggered set of ZP CSI-RS resources in each slot of the aggregation window, when processing a PDSCH transmission received in each slot of the aggregation window.

In one aspect, the UE may determine that the triggered set of ZP CSI-RS resources applies to only the initial slot (in which the DCI indication is received). In this case, the UE may determine to rate match around the triggered set of ZP CSI-RS resources in the first slot and refrain from performing rate matching in the subsequent slots of the aggregation window.

In one aspect, the UE may be configured to adapt its rate matching behavior based on signaling from a gNB and/or other network entity. For example, the UE may receive an indication (e.g., via radio resource control (RRC) signaling or DCI signaling) triggering the UE to: (i) perform rate matching around the triggered set of ZP CSI-RS resources in each slot of the aggregation window or (ii) perform rate matching around the triggered set of ZP CSI-RS resources in only the first slot of the aggregation window.

In this manner, the techniques presented herein can resolve ambiguities associated with PDSCH processing (involving rate matching) in cases of slot aggregation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100, in which aspects of the present disclosure may be performed, e.g., for rate matching of ZP CSI-RS in slot aggregation scenarios. In one example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

As illustrated, UE 120a includes a rate matching component 160, which is configured to implement one or more techniques described herein for performing rate matching of ZP CSI-RS in slot aggregation scenarios. Using the rate matching component 160, the UE 120a may receive, in a first slot of multiple aggregated slots, an indication in DCI that triggers a set of ZP CSI-RS resources (also referred to herein as a ZP CSI-RS resource set or a ZP CSI-RS resource configuration) from multiple sets of ZP CSI-RS resources. The UE 120a may determine, based on the DCI indication received in the first slot, a rate matching behavior for processing a PDSCH transmission received in the first slot and at least a second subsequent slot of the multiple aggregated slots. The UE 120a may process the PDSCH transmission received in the first slot and at least the second slot in accordance with the rate matching behavior.

As also illustrated, BS 110a (e.g., network entity or network node, such as a gNB) includes a rate matching component 170, which is configured to implement one or more techniques described herein for performing rate matching of ZP CSI-RS in slot aggregation scenarios. Using the rate matching component 170, the BS 110a may determine a rate matching behavior for processing a PDSCH transmission and transmit to the UE (e.g., UE 110a) an indication in DCI that triggers a set of ZP CSI-RS resources from multiple sets of ZP CSI-RS resources. The DCI indication may be transmitted in a first slot of multiple aggregated slots. The BS 110a (using the rate matching component 170) may transmit a PDSCH in the first slot and at least a second subsequent slot of the aggregated slots. The rate matching behavior for processing the PDSCH transmitted in the first slot and at least the second slot is based in part on (e.g., implicitly based on) the DCI indication transmitted in the first slot.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
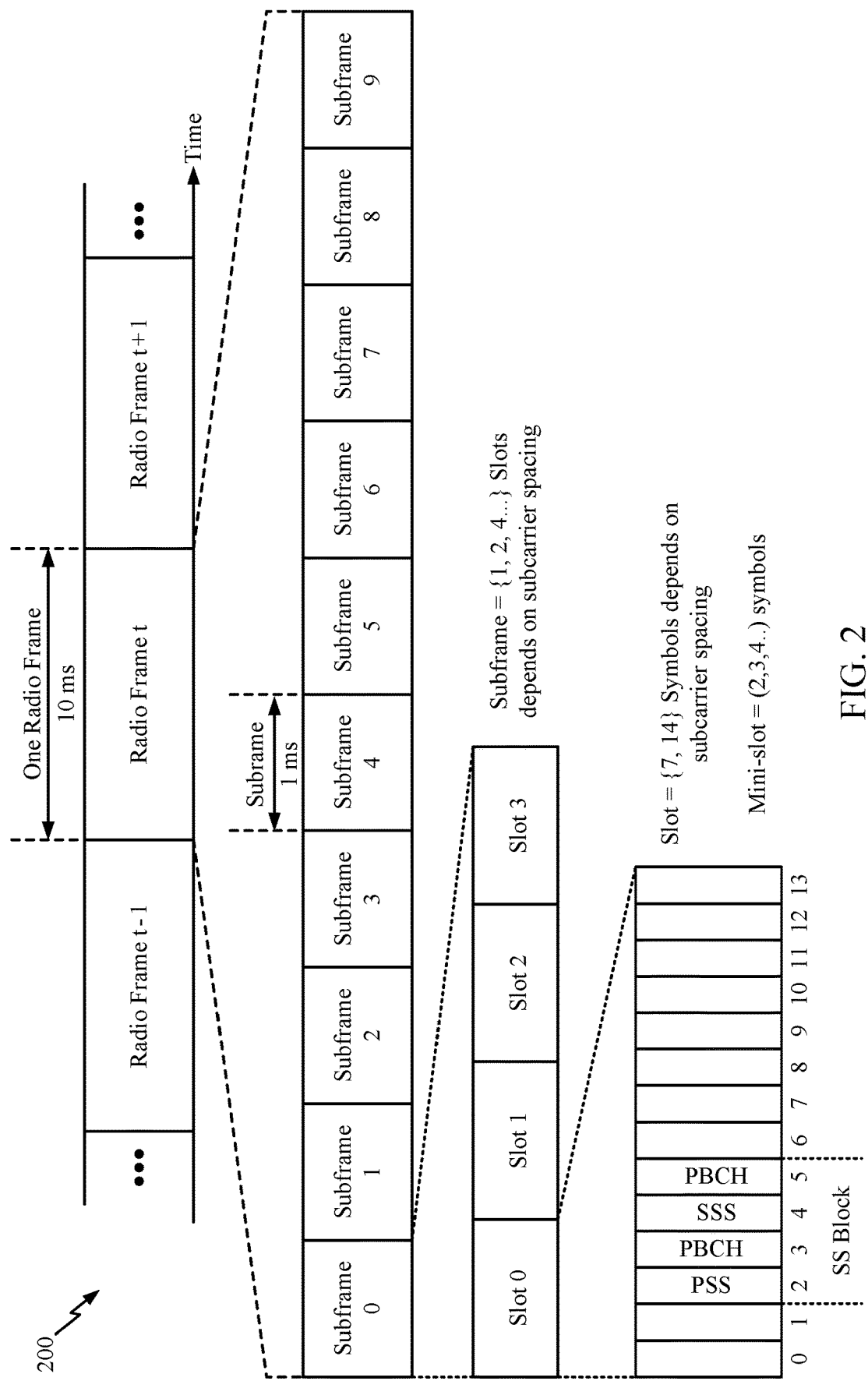
FIG. 2 illustrates an example of a frame format for a new radio (NR) system, in accordance with certain aspects of the present disclosure.

FIG. 2 is a diagram showing an example of a frame format 200 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information. In some cases, the slot format may indicate that multiple consecutive slots have the same link direction (e.g., downlink or uplink). The consecutive slots may form an aggregation window. Referring to the frame format 200 in FIG. 2, the aggregation window may extend across slots within a subframe (e.g., slots 0-3 of subframe 0 of radio frame t), may extend across subframes (e.g., subframe 0 and subframe 1 of radio frame t), or extend across radio frames (e.g., radio frame t and radio frame t+1).

Further, in some cases, the UE may be configured with aggregationFactorDL (e.g., pdsch-AggregationFactor) when receiving PDSCH (e.g., scheduled by PDCCH). In situations where aggregationFactorDL>1, the same symbol allocation for (TB(s) of) PDSCH is applied across the aggregationFactorDL consecutive slots. Thus, the UE may expect that the TB is repeated within each symbol allocation among each of the aggregationFactorDL consecutive slots and that the PDSCH is limited to a single transmission layer.

In NR, a synchronization signal/physical broadcast channel (SS/PBCH) block is transmitted (also referred to as a synchronization signal block (SSB)). The SS/PBCH block includes a PSS, a SSS, and a two symbol PBCH. The SS/PBCH block can be transmitted in a fixed slot location, such as the symbols 2-5 as shown in FIG. 2. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS/PBCH blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

As noted, in some systems (e.g., NR), decoding of PDSCH may involve performing rate matching around certain REs indicated as unavailable for PDSCH. For example, such REs may be allocated to cell-specific reference signals (CRSs), CSI-RSs, tracking reference signals (TRSs), etc. CSI-RSs in general may include ZP CSI-RSs and non-zero power (NZP) CSI-RSs. For a ZP CSI-RS, the UE may assume that the REs allocated to the ZP CSI-RS(s) are not used for PDSCH transmission. That is, the ZP CSI-RS resources may correspond to a set of REs that are silent (e.g., muted REs). PDSCH may be mapped (or rate-matched) around the REs occupied by ZP CSI-RSs.

The UE may be configured with one or more ZP CSI-RS resource configurations (e.g., ZP-CSI-RS-ResourceSet) for PDSCH decoding. Each ZP CSI-RS resource configuration may include one or more ZP CSI-RS resources (e.g., given by higher layer parameter ZP-CSI-RS-Resource). Each ZP CSI-RS resource configuration may include a set of parameters configured, e.g., via higher layer signaling, such as RRC signaling from a gNB. In one reference example, the set of parameters in a given ZP CSI-RS resource configuration may include, but is not limited to, the following:

zp-CSI-RS-ResourceId: in ZP-CSI-RS-Resource determines ZP CSI-RS resource configuration identity
NrofPorts: defines the number of CSI-RS ports
CDMType: defines CDM values and pattern
ZP-CSI-RS-FreqBand: parameters enabling configuration of frequency occupancy of a ZP-CSI-RS resource within a bandwidth part (BWP). If the configured bandwidth is larger than the corresponding BWP, the UE may assume that the actual CSI-RS bandwidth is equal to the BWP size
resourceMapping given by ZP-CSI-RS-Resource defines the OFDM symbol and subcarrier occupancy of the ZP-CSI-RS resource(s) within a slot
periodicityAndOffset in ZP-CSI-RS-Resource defines the ZP-CSI-RS periodicity and slot offset for periodic/semi-persistent ZP-CSI-RS The ZP CSI-RS time domain behavior of a ZP CSI-RS resource configuration can be periodic, semi-persistent or aperiodic. All the resources in a ZP CSI-RS resource set may be configured with the same ZP CSI-RS time domain behavior (e.g., periodic, semi-persistent, aperiodic).

In some cases, the UE may be configured with multiple sets of ZP CSI-RS resource sets for aperiodic triggering. For example, a list of ZP-CSI-RS-ResourceSet(s), provided by a higher layer parameter aperiodic-ZP-CSI-RS-ResourceSetstoAddModList in PDSCH-Config, may be configured for aperiodic triggering. The UE may be configured with a DCI field (e.g., ZP CSI-RS trigger) for triggering a particular ZP CSI-RS resource set. The DCI field triggers one aperiodic ZP-CSI-RS-ResourceSet in the list aperiodic-ZP-CSI-RS-ResourceSetstoAddModList, e.g., by indicating the aperiodic ZP CSI-RS resource set ID. In some cases, the UE may be configured with one or more different ZP-CSI-RS-ResourceSet(s) for each BWP. The bit-length of the DCI field ZP CSI-RS trigger may depend on the number of aperiodic ZP-CSI-RS-ResourceSet(s) configured.

One issue with the conventional approach for triggering an aperiodic ZP CSI-RS resource set is that the DCI field (e.g., ZP CSI-RS trigger) may not indicate which slot(s) the resources of the aperiodic ZP CSI-RS resource set applies to in slot aggregation scenarios. That is, the "resourceMapping" parameter of the triggered ZP CSI-RS resource set applies to a single slot, but may not indicate which slot of an aggregation window the "resourceMapping" parameter applies to. This ambiguity can impact the UE rate matching behavior in slot aggregation scenarios, and in turn, significantly impact UE processing (or decoding) of PDSCH in the aggregation window.

Figure 3:
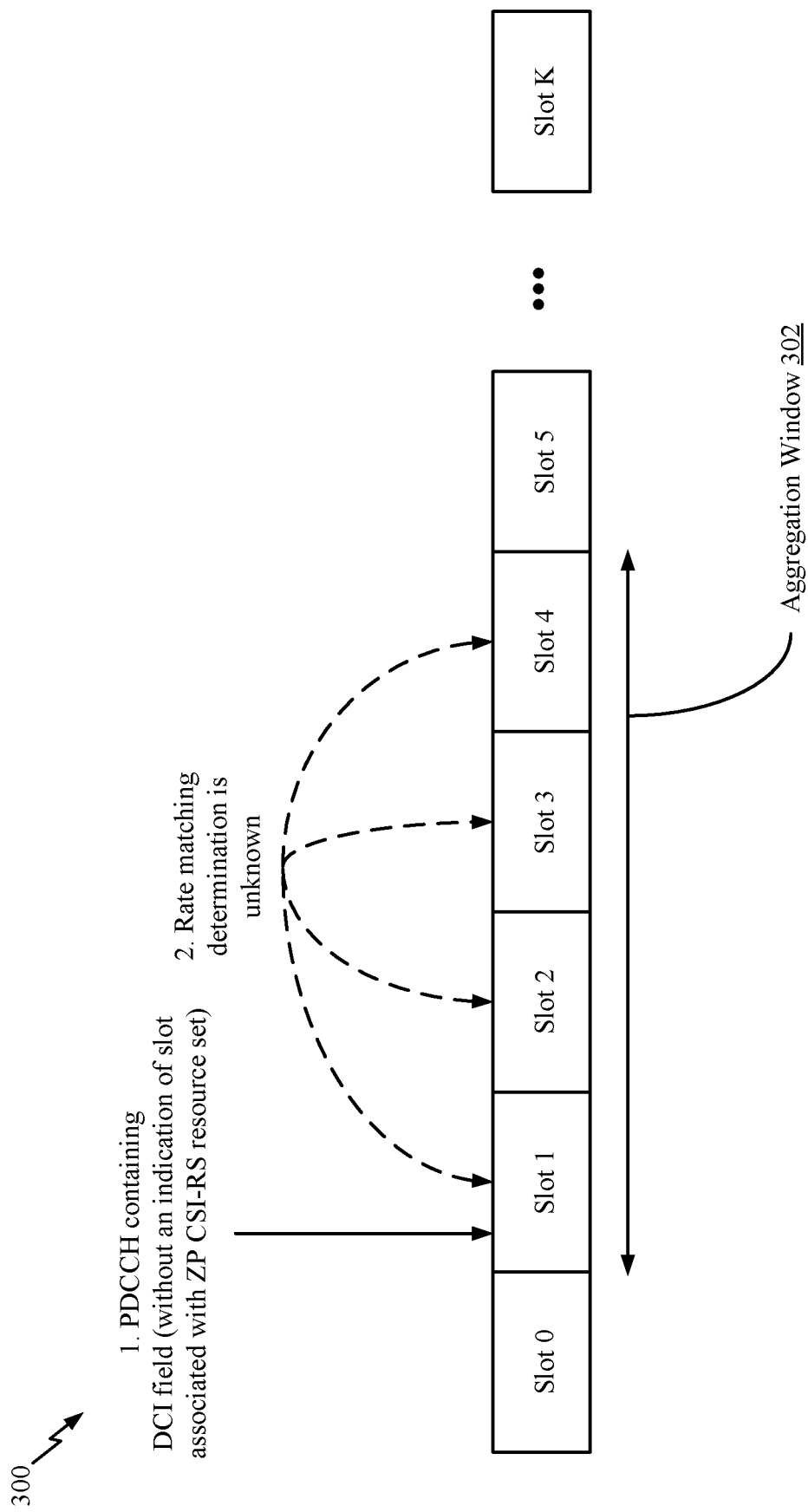
FIG. 3 illustrates an example rate matching ambiguity in a slot aggregation scenario, in accordance with certain aspects of the present disclosure.

FIG. 3, for example, depicts an example scenario of the rate matching ambiguity that can occur in slot aggregation scenarios, in accordance with certain aspects of the present disclosure. In this example, the UE may be configured, e.g., via higher layer signaling, with an aggregationFactorDL=4. As shown, if the UE is configured in this manner, when the UE receives a PDCCH that schedules a PDSCH in a given slot (e.g., slot 1), the UE may expect that the PDSCH allocation is repeated (e.g., is the same) across each of the aggregationFactorDL slots (e.g., slots 1-4), resulting in aggregation window 302. Note that while FIG. 3 depicts aggregation window 302 with four slots, the aggregation window 302 can span any number of slots (e.g., within a subframe, across subframes, across radio frames, etc.), based on the aggregationFactorDL configured for the UE. Similarly, while FIG. 3 depicts the aggregation window 302 starting at slot 1 and ending at slot 4, the aggregation window 302 can have other starting slot locations and ending slot locations, e.g., depending on the slot scheduled by PDCCH.

As shown in FIG. 3, the UE may receive (within PDCCH) a DCI field (e.g., ZP CSI-RS trigger) in slot 1 of the aggregation window 302 that triggers a particular ZP CSI-RS resource set for the UE. However, because the DCI field does not indicate which slot(s) 1-4 of the aggregation window 302 applies to, the UE may not know whether and/or how to perform rate matching in slots 1-4 when processing a PDSCH transmission received in slots 1-4 of the aggregation window. In the particular example depicted in FIG. 3, the UE may not know whether the triggered ZP CSI-RS resource set applies to only a single slot (e.g., slot 1, slot 2, slot 3, or slot 4) in the aggregation window 302, a subset of slots of the aggregation window 302, or all of the slots of the aggregation window 302. Accordingly, it may be desirable to provide techniques and apparatus for determining how to perform rate matching around ZP CSI-RS resources in slot aggregation scenarios.

Example Rate Matching of ZP CSI-RS With Slot Aggregation

Aspects of the present disclosure provide techniques and apparatus for determining a PDSCH rate matching behavior for slots of an aggregation window based on the ZP CSI-RS resource configuration triggered in an initial (first) slot of the aggregation window. In this manner, the techniques presented herein can resolve ambiguities associated with PDSCH processing (involving rate matching) in cases of slot aggregation.

Figure 4:
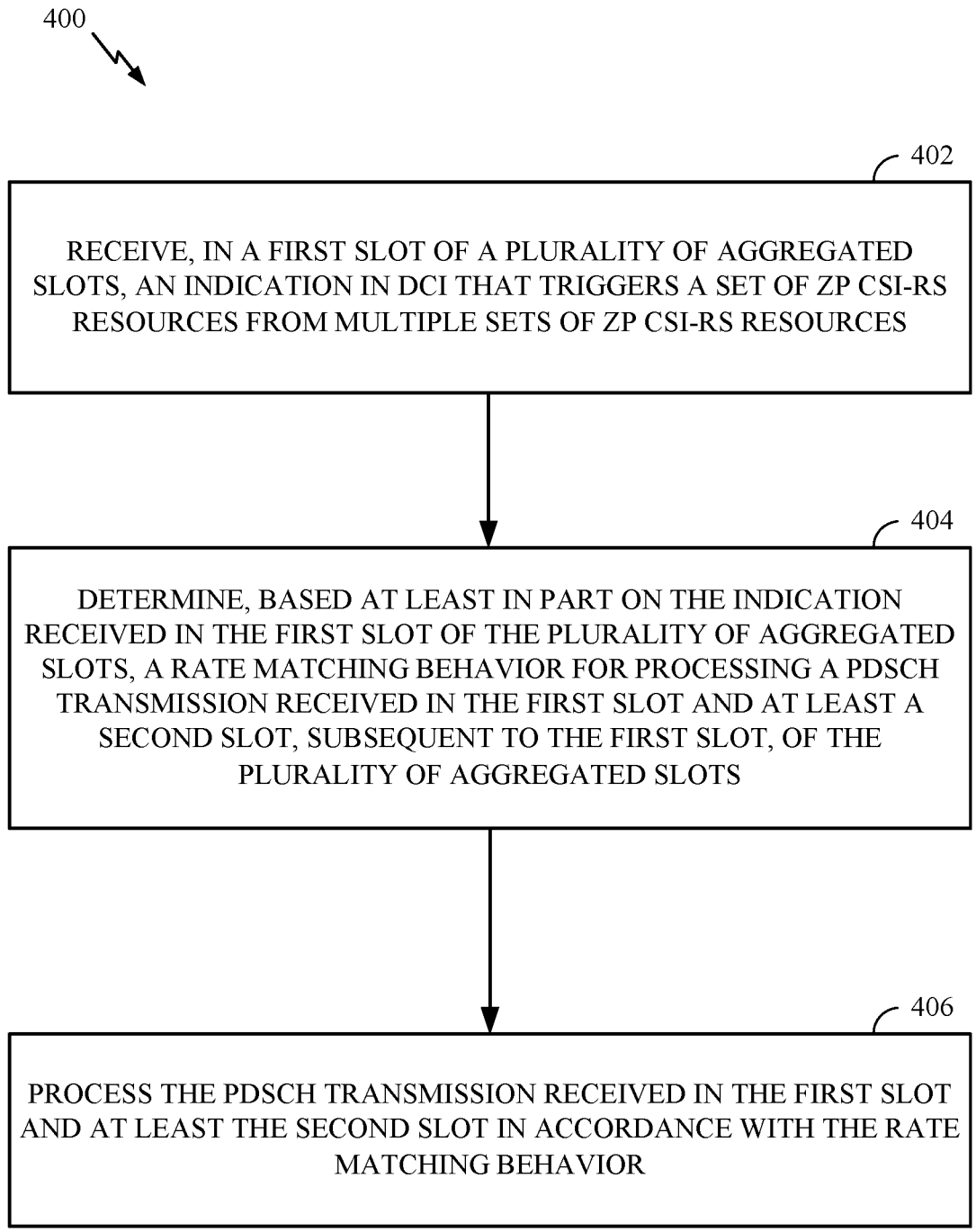
FIG. 4 illustrates example operations that may be performed by a user equipment (UE), in accordance with aspects of the present disclosure.

FIG. 4 is a flow diagram illustrating example operations 400 for wireless communication, in accordance with certain aspects of the present disclosure. The operations 400 may be performed, for example, by a UE (e.g., the UE 120a in the wireless communication network 100). Operations 400 may be implemented as software components that are executed and run on one or more processors (e.g., controller/processor 1080 of FIG. 10). Further, the transmission and reception of signals by the UE in operations 400 may be enabled, for example, by one or more antennas (e.g., antennas 1052 of FIG. 10). In certain aspects, the transmission and/or reception of signals by the UE may be implemented via a bus interface of one or more processors (e.g., controller/processor 1080) obtaining and/or outputting signals.

Operations 400 begin, at 402, where the UE receives, in a first slot of a plurality of aggregated slots, an (first) indication in DCI (e.g., DCI field ZP CSI-RS trigger) that triggers a set of ZP CSI-RS resources from multiple sets of ZP CSI-RS resources.

At 404, the UE determines, based at least in part on the indication received in the first slot of the plurality of aggregated slots, a rate matching behavior for processing a PDSCH transmission received in the first slot and at least a second slot, subsequent to the first slot, of the plurality of aggregated slots. The rate matching behavior, for example, may include performing rate matching (around the triggered set of ZP CSI-RS resources) or refraining from performing rate matching. In some aspects, determining the rate matching behavior may include determining which slots of the plurality of aggregated slots (including the first slot and the second slot) to perform rate matching around the triggered set of ZP CSI-RS resources.

At 406, the UE processes the PDSCH transmission received in the first slot and at least the second slot in accordance with the rate matching behavior. For example, the UE may process the PDSCH transmission in a given slot by performing rate matching around the triggered set of ZP CSI-RS resources in the slot or by refraining from performing rate matching in the slot.

In one aspect, the UE may determine (e.g., at 404), based on the first indication received in the first slot, that the triggered set of ZP CSI-RS resources is associated with (e.g., applies to) each slot of the plurality of aggregated slots, including the first slot and the second slot. For example, the UE may determine that if it is configured with slot aggregation (e.g., aggregationFactorDL>1), the ZP CSI-RS resource set (or pattern) triggered in the first slot (e.g., resourceMapping given by ZP-CSI-RS-Resource) defines the OFDM symbol and subcarrier occupancy of the ZP CSI-RS resources within all slots of the aggregation window.

In this aspect, the UE (e.g., at 404) may determine that the rate matching behavior is to perform rate matching around the triggered set of ZP CSI-RS resources in each slot of the plurality of aggregated slots, including the first slot and the second slot. Based on this determination, the UE (e.g., at 406) may process the PDSCH transmission received in each slot of the plurality of aggregated slots by rate matching around the triggered set of ZP CSI-RS resources in the slot.

Figure 5:
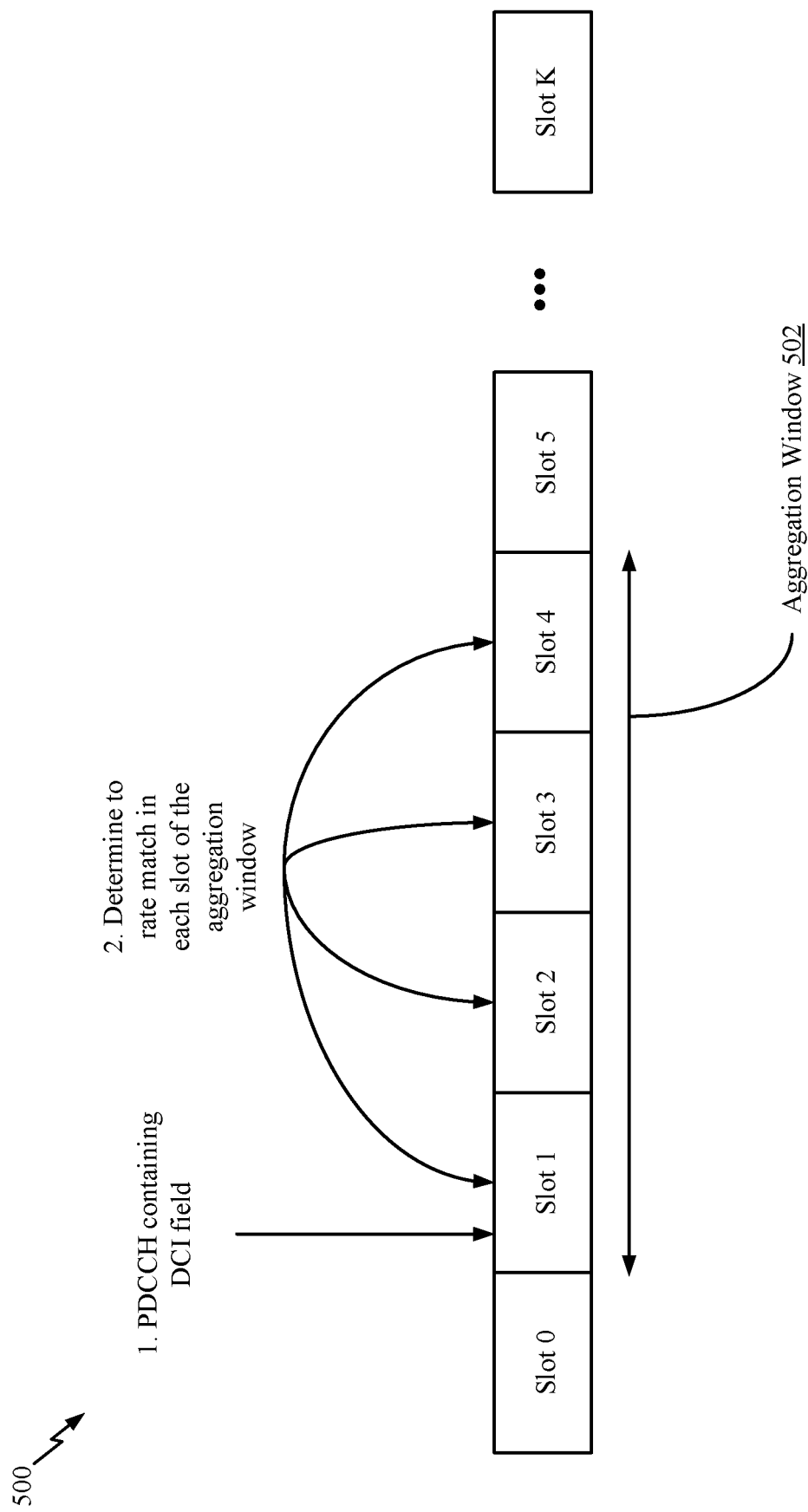
FIG. 5 illustrates an example of resolving a rate matching ambiguity in a slot aggregation scenario, in accordance with certain aspects of the present disclosure.

FIG. 5 depicts an example scenario of resolving the rate matching ambiguity in slot aggregation scenarios, in accordance with certain aspects of the present disclosure. In particular, FIG. 5 depicts an example scenario where the UE determines to rate match around the set of ZP CSI-RS resources (triggered in slot 1 of the aggregation window 502) in each slot of the aggregation window 502. Note that while FIG. 5 depicts aggregation window 502 with four slots, the aggregation window 502 can span any number of slots (e.g., within a subframe, across subframes, across radio frames, etc.), based on the aggregationFactorDL configured for the UE. Similarly, while FIG. 5 depicts the aggregation window 502 starting at slot 1 and ending at slot 4, the aggregation window 502 can have other starting slot locations and ending slot locations, e.g., depending on the slot scheduled by PDCCH.

Referring back to FIG. 4, in some aspects, the operations 400 may include receiving (by the UE) an (other) indication of at least one of a set of NZP CSI-RS resources or a set of TRS resources in at least one of the plurality of aggregated slots. For example, the determination (e.g., at 404) to rate match around the triggered set of ZP CSI-RS resources in each slot of the aggregation window may enable the gNB to schedule (e.g., via an uplink grant) the UE to receive NZP CSI-RSs and/or TRSs in one or more of the slots. The NZP CSI-RSs and/or TRSs may be allocated to resources that overlap with the indicated ZP CSI-RS resources, and the UE may rate match around the NZP CSI-RSs and/or TRSs when decoding PDSCH.

In some aspects, the UE may assume (e.g., a priori) that the set of ZP CSI-RS resources triggered in the first slot is the same set of ZP CSI-RS resources for all other slots of the aggregation window. That is, the UE may be pre-configured to determine (e.g., without any signaling or indication from the gNB) that the set of ZP CSI-RS resources triggered in the first slot is the same set of ZP CSI-RS resources for all other slots of the aggregation window. Based on this assumption, the UE may determine to perform rate matching in each of the remaining slots based on the triggered set of ZP CSI-RS resources. In some cases, such an assumption may also enable the gNB to schedule (e.g., via an uplink grant) the UE to receive NZP CSI-RSs and/or TRSs in one or more of the aggregated slots.

In one aspect, the UE may determine (e.g., at 404) that the triggered set of ZP CSI-RS resources is associated with only the first slot of the plurality of aggregated slots. That is, the UE may determine that the ZP CSI-RS configuration is only applicable to the slot in which the ZP CSI-RS configuration is triggered. Based on this determination, the UE (e.g., at 404) may determine that the rate matching behavior is to refrain from performing rate matching in each of the subsequent remaining slots of the aggregated slots. The UE (e.g., at 406) may then process the PDSCH transmission by rate matching around the triggered set of ZP CSI-RS resources when processing the PDSCH transmission received in the first slot and refraining from rate matching when processing the PDSCH transmission received in each of the subsequent remaining slots of the aggregated slots.

In this case, if other (NZP) CSI-RSs (and/or TRSs) are triggered by uplink DCI in other slots, the UE may not perform rate matching in these slots. Similarly, from the gNB perspective, the gNB may assume that the UE will not perform rate matching in this scenario. In some cases, the gNB may still decide to schedule CSI-RSs and/or TRSs in the other slots, even if there is an impact to the PDSCH transmission (e.g., the gNB may determine that an estimated impact to the PDSCH is below a threshold, a priority of receiving feedback based on CSI-RSs and/or TRSs meets a certain threshold, etc.).

Figure 6:
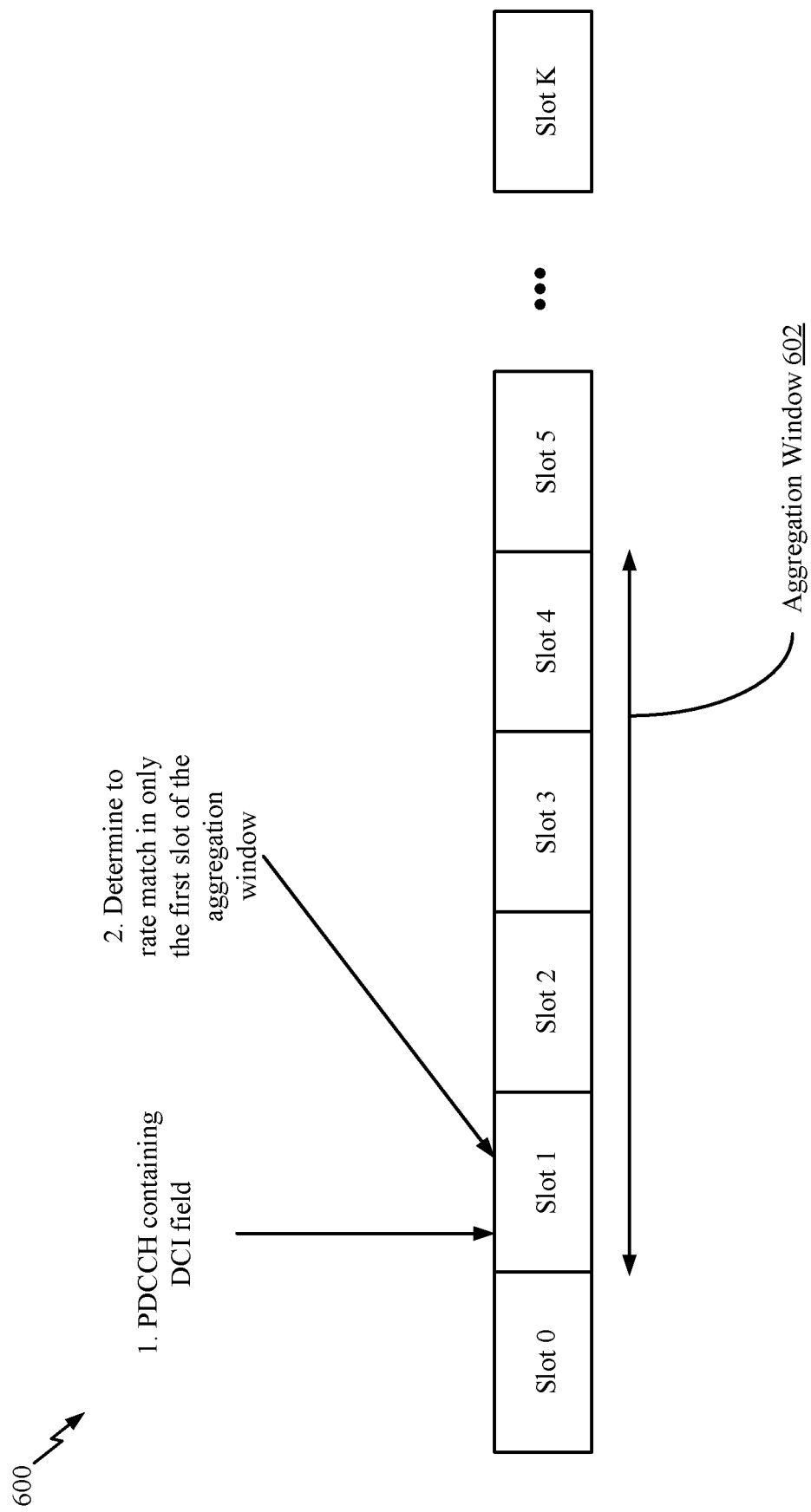
FIG. 6 illustrates another example of resolving a rate matching ambiguity in a slot aggregation scenario, in accordance with certain aspects of the present disclosure.

FIG. 6 depicts an example scenario of resolving the rate matching ambiguity in slot aggregation scenarios, in accordance with certain aspects of the present disclosure. In particular, FIG. 6 depicts an example scenario where the UE determines to rate match around the set of ZP CSI-RS resources (triggered in slot 1 of the aggregation window 602) in only the first slot (e.g., slot 1) of the aggregation window 602. Note that while FIG. 6 depicts aggregation window 602 with four slots, the aggregation window 602 can span any number of slots (e.g., within a subframe, across subframes, across radio frames, etc.), based on the aggregationFactorDL configured for the UE. Similarly, while FIG. 6 depicts the aggregation window 602 starting at slot 1 and ending at slot 4, the aggregation window 602 can have other starting slot locations and ending slot locations, e.g., depending on the slot scheduled by PDCCH.

Referring back to FIG. 4, in some aspects, the operations 400 may include receiving (by the UE) an (second) indication that explicitly triggers the rate matching behavior. For example, the determination of whether to perform rate matching in the other slots (e.g., based on the ZP CSI-RS resources triggered in the first slot) may be determined based on signaling from the gNB. In some examples, the UE may receive an explicit indication of the rate matching behavior via at least one of RRC signaling, media access control (MAC) control element (MAC-CE) signaling, or DCI signaling from the gNB. For example, the UE may receive at least one of RRC signaling, MAC-CE signaling, or DCI signaling that indicates (1) that the triggered set of ZP CSI-RS resources applies to all slots of the aggregated slots, or (2) that the triggered set of ZP CSI-RS resources applies only to the first slot (e.g., the slot in which the set of ZP CSI-RS resources is triggered). In the case of DCI signaling, some of the current DCI fields can be reinterpreted and used for indicating (1) or (2). In one reference example, the precoding resource group (PRG) size indication within DCI can be used to signal an indication of (1) or (2).

In some aspects, after receiving the indication of the ZP CSI-RS resources in the first slot, the UE may expect to not receive an uplink grant (e.g., uplink DCI) triggering TRS or (NZP) CSI-RS in the remaining slots of the aggregation window. Thus, in this aspect, the UE may refrain from performing rate matching in the remaining slots. This aspect, however, may impact UE processing of PDSCH.

Figure 7:
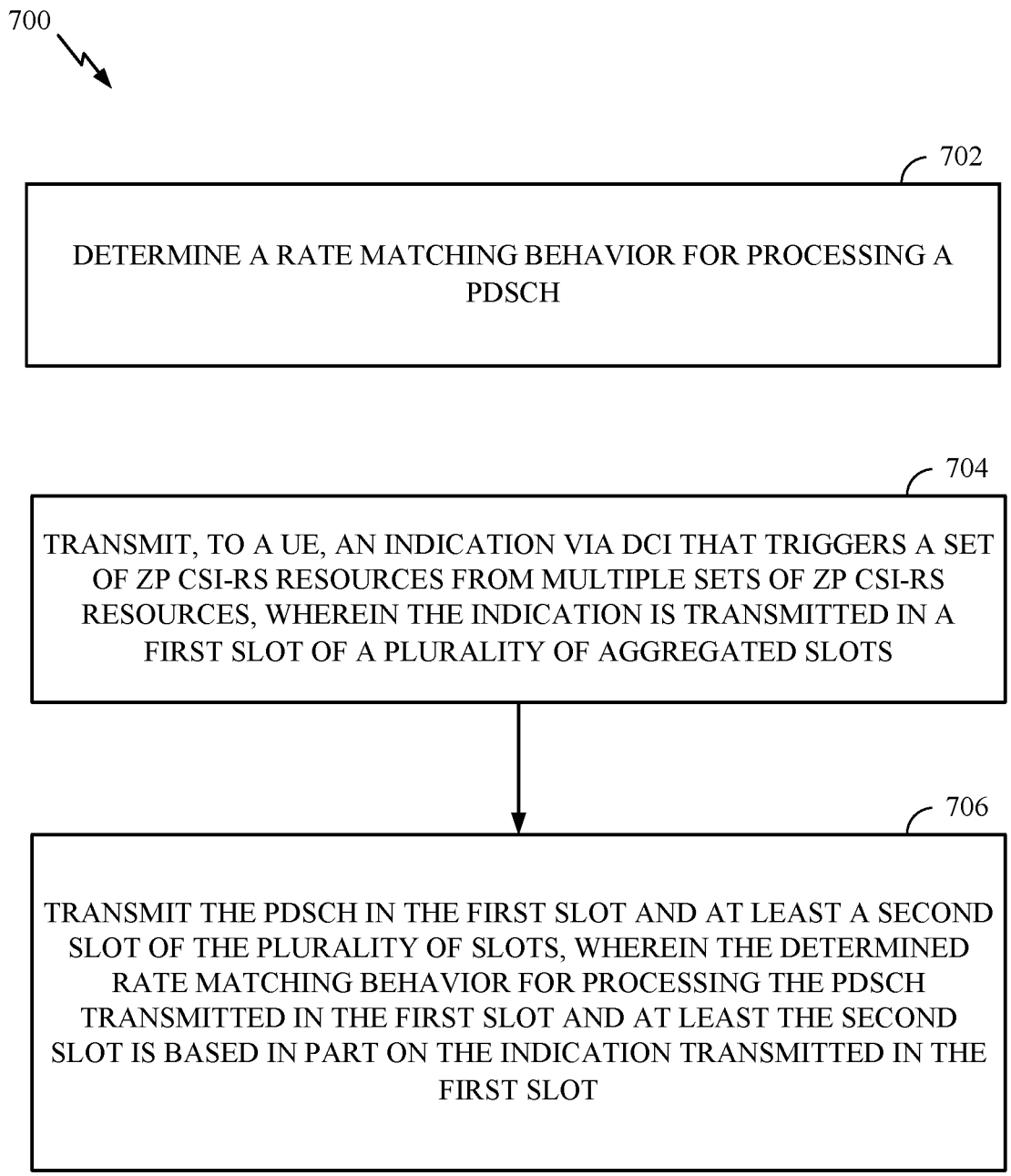
FIG. 7 illustrates example operations that may be performed by a network entity, in accordance with aspects of the present disclosure.

FIG. 7 is a flow diagram illustrating example operations 700 for wireless communication, in accordance with certain aspects of the present disclosure. The operations 700 may be performed, for example, by a gNB (e.g., the BS 110a in the wireless communication network 100). The operations 700 may be complimentary operations by the gNB to the operations 400 performed by the UE. Operations 700 may be implemented as software components that are executed and run on one or more processors (e.g., controller/processor 1040 of FIG. 10). Further, the transmission and reception of signals by the gNB in operations 700 may be enabled, for example, by one or more antennas (e.g., antennas 1034 of FIG. 10). In certain aspects, the transmission and/or reception of signals by the gNB may be implemented via a bus interface of one or more processors (e.g., controller/processor 1040) obtaining and/or outputting signals.

Operations 700 begin, at 702, where the gNB determines a rate matching behavior for processing a PDSCH. At 704, the gNB transmits, to a UE, an indication via DCI that triggers a set of ZP CSI-RS resources from multiple sets of ZP CSI-RS resources. The indication is transmitted in a first slot of a plurality of aggregated slots. At 706, the gNB transmits the PDSCH in the first slot and at least a second slot, subsequent to the first slot, of the plurality of aggregated slots. The determined rate matching behavior for processing the PDSCH transmitted in the first slot and at least the second slot is based in part on the first indication transmitted in the first slot.

In some aspects, the rate matching behavior may be signaled via at least one of RRC signaling or DCI signaling that indicates whether to perform rate matching around the set of ZP CSI-RS resources (triggered in the first slot) in only the first slot or in each slot of the aggregated slots.

In some aspects, the rate matching behavior may be to refrain from performing rate matching around the triggered set of ZP CSI-RS resources (indicated in the first slot) in at least the second slot. In this aspect, the signaling may indicate that the triggered set of ZP CSI-RS resources is only associated with the first slot (e.g., the slot in which the set of ZP CSI-RS resources is triggered) of the aggregated slots.

In some aspects, the rate matching behavior may be to perform rate matching around the triggered set of ZP CSI-RS resources (indicated in the first slot) in each slot of the aggregated slots. In this aspect, the signaling may indicate that the triggered set of ZP CSI-RS resources is associated with each slot of the plurality of aggregated slots.

In some cases, the rate matching behavior to apply in which slots may be explicitly indicated. For example, the gNB may transmit an (second) indication triggering the UE to (i) perform rate matching around the triggered set of ZP CSI-RS resources in each slot of the plurality of aggregated slots when processing the transmitted PDSCH in the respective slot or (ii) perform rate matching around the triggered set of ZP CSI-RS resources in only the first slot of the plurality of aggregated slots when processing the transmitted PDSCH in that slot.

This explicit signaling may be provided via MAC CE or RRC signaling. For example, RRC signaling may configure several sets of CSI-RS applicability for rate matching where each set covers all slots and a DCI transmission may be used to indicate which set to use. Signaling may also be provided via DCI, for example, via a bitmap used to indicate the slots for rate matching applicability. In some cases, a combination of these (MAC CE, RRC, and/or DCI) signaling approaches may be used to indicate the slots for rate matching applicability.

Figure 8:
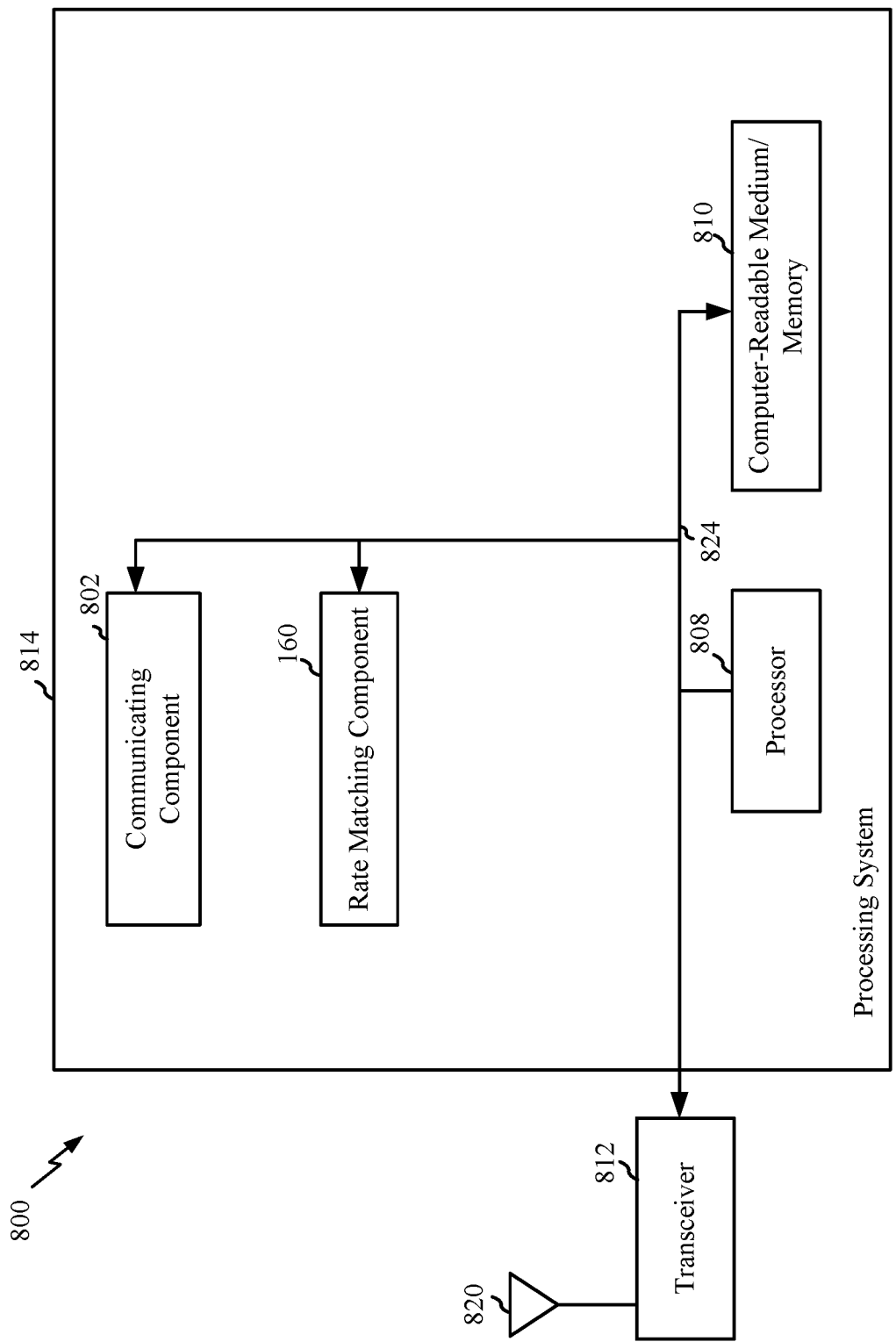
FIG. 8 illustrates a communications device that may include various components configured to perform operations for the techniques disclosed herein, in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 814 coupled to a transceiver 812. The transceiver 812 is configured to transmit and receive signals for the communications device 800 via an antenna 820, such as the various signals described herein. The processing system 814 may be configured to perform processing functions for the communications device 800, including processing signals received and/or to be transmitted by the communications device 800.

The processing system 814 includes a processor 808 coupled to a computer-readable medium/memory 810 via a bus 824. In certain aspects, the computer-readable medium/memory 810 is configured to store instructions that when executed by processor 808, cause the processor 808 to perform the operations illustrated in FIG. 4 and/or other operations for performing the various techniques discussed herein.

In certain aspects, the processing system 814 further includes a communicating component 802 for performing the operations illustrated at 402 in FIG. 4 and/or other communication operations described herein. Additionally, the processing system 814 includes a rate matching component 160 for performing the operations illustrated at 404 and 406 in FIG. 4 and/or operations described herein. The communicating component 802 and rate matching component 160 may be coupled to the processor 808 via bus 824. In certain aspects, the communicating component 802 and rate matching component 160 may be hardware circuits. In certain aspects, the communicating component 802 and rate matching component 160 may be software components that are executed and run on processor 808.

Figure 9:
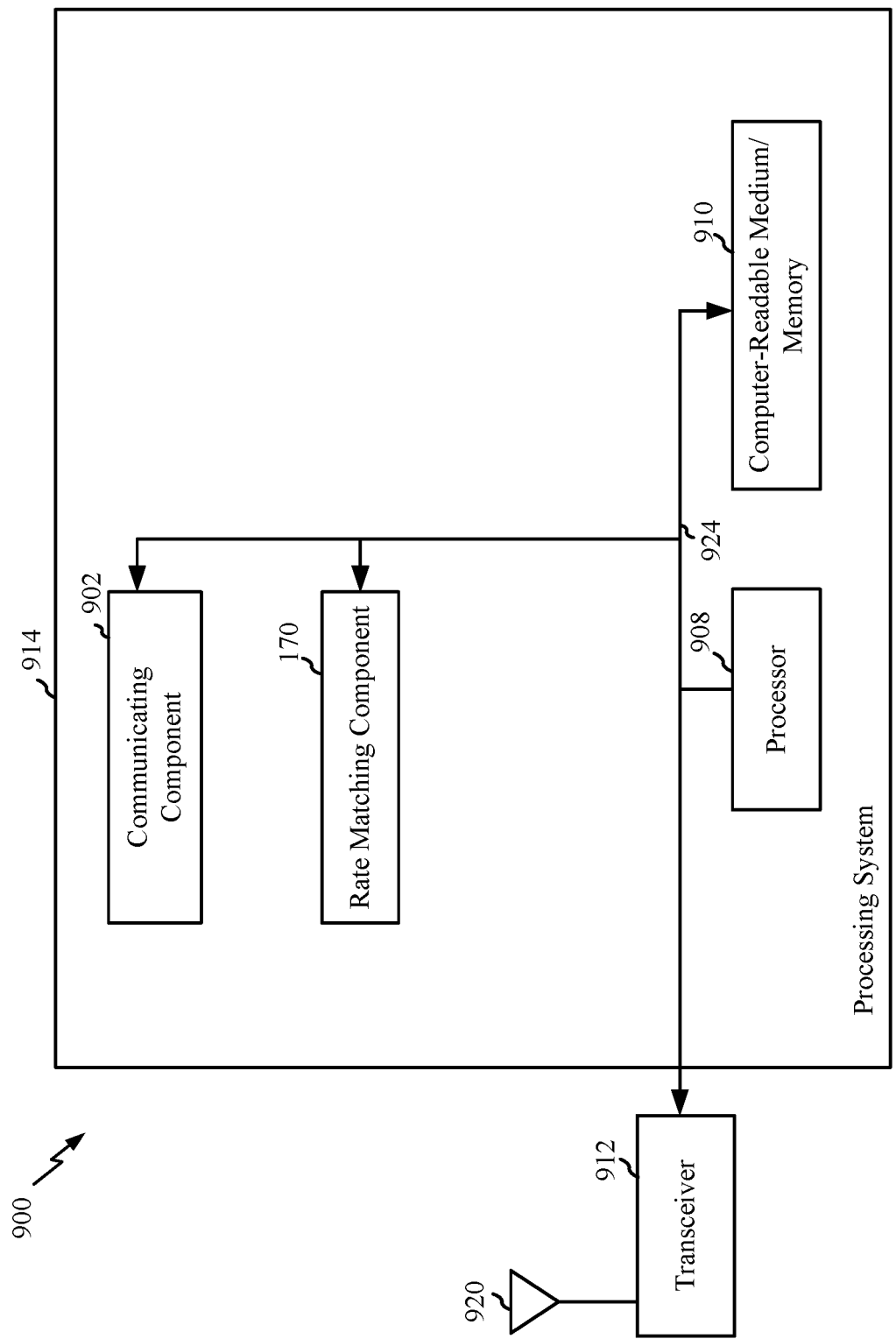
FIG. 9 illustrates a communications device that may include various components configured to perform operations for the techniques disclosed herein, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 914 coupled to a transceiver 912. The transceiver 912 is configured to transmit and receive signals for the communications device 900 via an antenna 920, such as the various signals described herein. The processing system 914 may be configured to perform processing functions for the communications device 900, including processing signals received and/or to be transmitted by the communications device 900.

The processing system 914 includes a processor 908 coupled to a computer-readable medium/memory 910 via a bus 924. In certain aspects, the computer-readable medium/memory 910 is configured to store instructions that when executed by processor 908, cause the processor 908 to perform the operations illustrated in FIG. 7 and/or other operations for performing the various techniques discussed herein.

In certain aspects, the processing system 914 further includes a communicating component 902 for performing the operations illustrated at 704 and 706 in FIG. 7 and/or other communication operations described herein. Additionally, the processing system 914 includes a rate matching component 170 for performing the operations illustrated at 702 in FIG. 7 and/or operations described herein. The communicating component 902 and rate matching component 170 may be coupled to the processor 908 via bus 924. In certain aspects, the communicating component 902 and rate matching component 170 may be hardware circuits. In certain aspects, the communicating component 902 and rate matching component 170 may be software components that are executed and run on processor 908.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Figure 10:
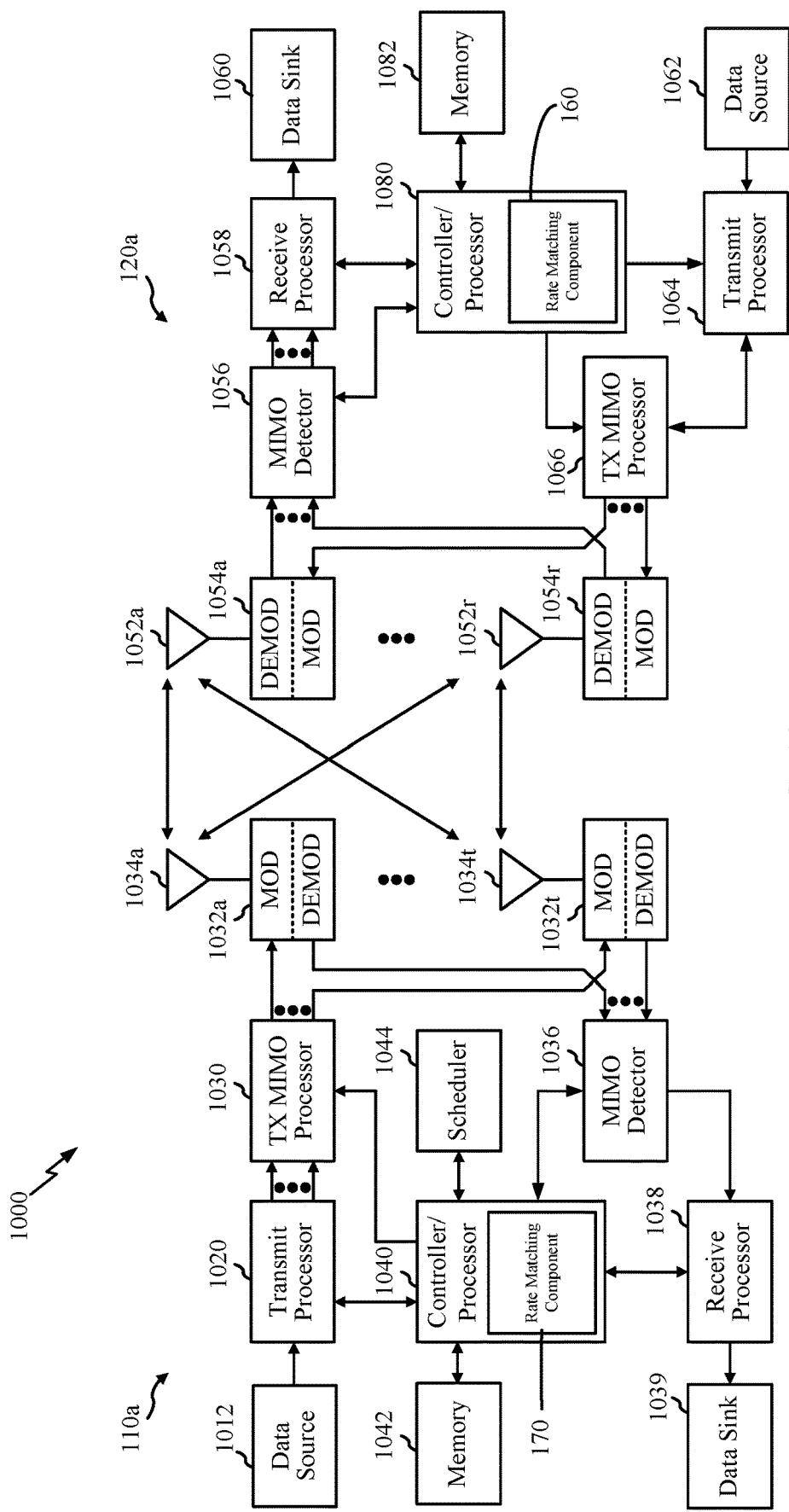
FIG. 10 is a block diagram conceptually illustrating a design of an example base station (BS) and user equipment (UE), in accordance with certain aspects of the present disclosure.

FIG. 10 illustrates example components of a BS (e.g., BS 110a) and a UE (e.g., UE 120a) (e.g., in the wireless communication network 100 of FIG. 1), which may be used to implement aspects of the present disclosure.

At the BS 110a, a transmit processor 1020 may receive data from a data source 1012 and control information from a controller/processor 1040. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1020 may process (e.g., encode and symbol map) the data and control information to obtain data symbols and control symbols, respectively. The transmit processor 1020 may also generate reference symbols, such as for the primary synchronization signal (PSS), secondary synchronization signal (SSS), and cell-specific reference signal (CRS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032a-1032t. Each modulator 1032 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1032a-1032t may be transmitted via the antennas 1034a-1034t, respectively.

At the UE 120a, the antennas 1052a-1052r may receive the downlink signals from the BS 110a and may provide received signals to the demodulators (DEMODs) in transceivers 1054a-1054r, respectively. Each demodulator 1054 may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators 1054a-1054r, perform MIMO detection on the received symbols if applicable, and provide detected symbols. A receive processor 1058 may process (e.g., demodulate, deinterleave, and decode) the detected symbols, provide decoded data for the UE 120a to a data sink 1060, and provide decoded control information to a controller/processor 1080.

On the uplink, at UE 120a, a transmit processor 1064 may receive and process data (e.g., for the physical uplink shared channel (PUSCH)) from a data source 1062 and control information (e.g., for the physical uplink control channel (PUCCH)) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the demodulators in transceivers 1054a-1054r (e.g., for SC-FDM, etc.), and transmitted to the BS 110a. At the BS 110a, the uplink signals from the UE 120a may be received by the antennas 1034, processed by the modulators 1032, detected by a MIMO detector 1036 if applicable, and further processed by a receive processor 1038 to obtain decoded data and control information sent by the UE 120a. The receive processor 1038 may provide the decoded data to a data sink 1039 and the decoded control information to the controller/processor 1040.

The memories 1042 and 1082 may store data and program codes for BS 110a and UE 120a, respectively. A scheduler 1044 may schedule UEs for data transmission on the downlink and/or uplink.

The controller/processor 1080 and/or other processors and modules at the UE 120a may perform or direct the execution of processes for the techniques described herein. For example, as shown in FIG. 10, the controller/processor 1080 of the UE 120a has a rate matching component 160, which is configured to implement one or more techniques described herein for performing rate matching of ZP CSI-RS in slot aggregation scenarios, according to aspects described herein. Similarly, controller/processor 1040 and/or other processors and modules at the BS 110a may perform or direct the execution of processes for the techniques described herein. For example, as shown in FIG. 10 the controller/processor 1040 of the BS 110a has a rate matching component 170, which is configured to implement one or more techniques described herein for performing rate matching of ZP CSI-RS in slot aggregation scenarios, according to aspects described herein. Although shown at the Controller/Processor, other components of the UE 120a and BS 110a may be used performing the operations described herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4 and/or 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

EXAMPLE EMBODIMENTS

Embodiment 1: A method for wireless communication by a user equipment (UE), comprising: receiving, in a first slot of a plurality of aggregated slots, a first indication in downlink control information (DCI) that triggers a set of zero power (ZP) channel state information reference signal (CSI-RS) resources from multiple sets of ZP CSI-RS resources; determining, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots; and processing the PDSCH transmission received in the first slot and at least the second slot in accordance with the rate matching behavior.

Embodiment 2: The method of Embodiment 1, wherein determining the rate matching behavior comprises determining in which slots of the plurality of aggregated slots, including the first slot and the second slot, to perform rate matching around the triggered set of ZP CSI-RS resources.

Embodiment 3: The method of any of Embodiments 1 or 2, further comprising determining, based on the first indication received in the first slot, that the triggered set of ZP CSI-RS resources is associated with each slot of the plurality of aggregated slots, including the first slot and the second slot.

Embodiment 4: The method of any of Embodiments 1 to 3, wherein determining the rate matching behavior comprises determining to perform rate matching around the triggered set of ZP CSI-RS resources in each slot of the plurality of aggregated slots, including the first slot and the second slot.

Embodiment 5: The method of any of Embodiments 3 or 4, further comprising receiving a second indication of at least one of a set of non-zero power (NZP) CSI-RS resources or a set of tracking reference signal (TRS) resources in at least one slot of the plurality of aggregated slots, wherein at least one of the set of NZP CSI-RS resources or the set of TRS resources overlaps the triggered set of ZP CSI-RS resources.

Embodiment 6: The method of any of Embodiments 1 or 2, further comprising determining that the triggered set of ZP CSI-RS resources is associated with only the first slot.

Embodiment 7: The method of any of Embodiments 1, 2, or 6, wherein determining the rate matching behavior comprises determining to refrain from performing rate matching in at least the second slot.

Embodiment 8: The method of any of Embodiments 1, 2, 6, or 7, further comprising receiving a second indication that triggers the rate matching behavior.

Embodiment 9: The method of Embodiment 8, wherein the second indication is received via radio resource control (RRC) signaling or via DCI signaling.

Embodiment 10: The method of any of Embodiments 8 or 9, wherein the second indication triggers, as the rate matching behavior, one of: (i) performing rate-matching around the triggered set of ZP CSI-RS resources in each slot of the plurality of aggregated slots and (ii) performing rate-matching around the triggered set of ZP CSI-RS resources in only the first slot of the plurality of aggregated slots.

Embodiment 11: An apparatus for wireless communications, comprising: a receiver configured to receive, in a first slot of a plurality of aggregated slots, a first indication in downlink control information (DCI) that triggers a set of zero power (ZP) channel state information reference signal (CSI-RS) resources from multiple sets of ZP CSI-RS resources; at least one processor configured to: determine, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots; and process the PDSCH transmission received in the first slot and at least the second slot in accordance with the rate matching behavior; and a memory coupled to the at least one processor.

Embodiment 12: The apparatus of Embodiment 11, wherein the at least one processor is configured to determine, for the rate matching behavior, in which slots of the plurality of aggregated slots, including the first slot and the second slot, to perform rate matching around the triggered set of ZP CSI-RS resources.

Embodiment 13: The apparatus of any of Embodiments 11 or 12, wherein the at least one processor is further configured to determine, based on the first indication received in the first slot, that the triggered set of ZP CSI-RS resources is associated with each slot of the plurality of aggregated slots, including the first slot and the second slot.

Embodiment 14: The apparatus of any of Embodiments 11 to 13, wherein the at least one processor is configured to determine to perform rate matching around the triggered set of ZP CSI-RS resources in each slot of the plurality of aggregated slots, including the first slot and the second slot.

Embodiment 15: The apparatus of any of Embodiments 13 or 14, wherein: the receiver is further configured to receive a second indication of at least one of a set of non-zero power (NZP) CSI-RS resources or a set of tracking reference signal (TRS) resources in at least one slot of the plurality of aggregated slots; and at least one of the set of NZP CSI-RS resources or the set of TRS resources overlaps the triggered set of ZP CSI-RS resources.

Embodiment 16: The apparatus of any of Embodiments 11 or 12, wherein the at least one processor is configured to determine that the triggered set of ZP CSI-RS resources is associated with only the first slot.

Embodiment 17: The apparatus of any of Embodiments 11, 12, or 16, wherein the at least one processor is configured to determine to refrain from performing rate matching in at least the second slot.

Embodiment 18: The apparatus of any of Embodiments 11, 12, 16, or 17, wherein the receiver is configured to receive a second indication that triggers the rate matching behavior.

Embodiment 19: The apparatus of Embodiment 18, wherein the second indication is received via radio resource control (RRC) signaling or via DCI signaling.

Embodiment 20: The apparatus of any of Embodiments 18 or 19, wherein the second indication triggers, as the rate matching behavior, one of: (i) performing rate-matching around the triggered set of ZP CSI-RS resources in each slot of the plurality of aggregated slots and (ii) performing rate-matching around the triggered set of ZP CSI-RS resources in only the first slot of the plurality of aggregated slots.

Embodiment 21: A method for wireless communication by a network entity, comprising: determining a rate matching behavior for processing a physical downlink shared channel (PDSCH); transmitting, to a user equipment (UE), a first indication via downlink control information (DCI) that triggers a set of zero power (ZP) channel state information reference signal (CSI-RS) resources from multiple sets of ZP CSI-RS resources, wherein the first indication is transmitted in a first slot of a plurality of aggregated slots; and transmitting the PDSCH in the first slot and at least a second slot, subsequent to the first slot, of the plurality of aggregated slots, wherein the determined rate matching behavior for processing the PDSCH transmitted in the first slot and at least the second slot is based in part on the first indication transmitted in the first slot.

Embodiment 22: The method of Embodiment 21, wherein the rate matching behavior is to perform rate matching around the triggered set of ZP CSI-RS resources in each slot of the plurality of aggregated slots.

Embodiment 23: The method of Embodiment 21, wherein the rate matching behavior is to perform rate matching around the triggered set of ZP CSI-RS resources in only the first slot of the plurality of aggregated slots.

Embodiment 24: The method of Embodiment 21, further comprising transmitting a second indication triggering the UE to (i) perform rate matching around the triggered set of ZP CSI-RS resources in each slot of the plurality of aggregated slots when processing the transmitted PDSCH or (ii) perform rate matching around the triggered set of ZP CSI-RS resources in only the first slot of the plurality of aggregated slots when processing the transmitted PDSCH.

Embodiment 25: The method of Embodiment 24, wherein the second indication is transmitted via radio resource control (RRC) signaling or DCI signaling.

Embodiment 26: An apparatus for wireless communications, comprising: at least one processor configured to determine a rate matching behavior for processing a physical downlink shared channel (PDSCH); a transmitter configured to: transmit, to a user equipment (UE), a first indication via downlink control information (DCI) that triggers a set of zero power (ZP) channel state information reference signal (CSI-RS) resources from multiple sets of ZP CSI-RS resources, wherein the first indication is transmitted in a first slot of a plurality of aggregated slots; and transmit the PDSCH in the first slot and at least a second slot, subsequent to the first slot, of the plurality of aggregated slots, wherein the determined rate matching behavior for processing the PDSCH transmitted in the first slot and at least the second slot is based in part on the first indication transmitted in the first slot; and a memory coupled to the at least one processor.

Embodiment 27: The apparatus of Embodiment 26, wherein the rate matching behavior is to perform rate matching around the triggered set of ZP CSI-RS resources in each slot of the plurality of aggregated slots.

Embodiment 28: The apparatus of Embodiment 26, wherein the rate matching behavior is to perform rate matching around the triggered set of ZP CSI-RS resources in only the first slot of the plurality of aggregated slots.

Embodiment 29: The apparatus of Embodiment 26, wherein the transmitter is further configured to transmit a second indication triggering the UE to (i) perform rate matching around the triggered set of ZP CSI-RS resources in each slot of the plurality of aggregated slots when processing the transmitted PDSCH or (ii) perform rate matching around the triggered set of ZP CSI-RS resources in only the first slot of the plurality of aggregated slots when processing the transmitted PDSCH.

Embodiment 30: The apparatus of Embodiment 29, wherein the second indication is transmitted via radio resource control (RRC) signaling or DCI signaling.

Embodiment 31: An apparatus for wireless communications, comprising: means for receiving, in a first slot of a plurality of aggregated slots, a first indication in downlink control information (DCI) that triggers a set of zero power (ZP) channel state information reference signal (CSI-RS) resources from multiple sets of ZP CSI-RS resources; means for determining, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots; and means for processing the PDSCH transmission received in the first slot and at least the second slot in accordance with the rate matching behavior.

Embodiment 32: The apparatus of Embodiment 31, wherein means for determining the rate matching behavior comprises means for determining in which slots of the plurality of aggregated slots, including the first slot and the second slot, to perform rate matching around the triggered set of ZP CSI-RS resources.

Embodiment 33: The apparatus of any of Embodiments 31 or 32, further comprising means for determining, based on the first indication received in the first slot, that the triggered set of ZP CSI-RS resources is associated with each slot of the plurality of aggregated slots, including the first slot and the second slot.

Embodiment 34: The apparatus of any of Embodiments 31 to 33, wherein means for determining the rate matching behavior comprises means for determining to perform rate matching around the triggered set of ZP CSI-RS resources in each slot of the plurality of aggregated slots, including the first slot and the second slot.

Embodiment 35: The apparatus of any of Embodiments 33 or 34, further comprising means for receiving a second indication of at least one of a set of non-zero power (NZP) CSI-RS resources or a set of tracking reference signal (TRS) resources in at least one slot of the plurality of aggregated slots, wherein at least one of the set of NZP CSI-RS resources or the set of TRS resources overlaps the triggered set of ZP CSI-RS resources.

Embodiment 36: The apparatus of any of Embodiments 31 or 32, further comprising means for determining that the triggered set of ZP CSI-RS resources is associated with only the first slot.

Embodiment 37: The apparatus of any of Embodiments 31, 32, or 36, wherein means for determining the rate matching behavior comprises means for determining to refrain from performing rate matching in at least the second slot.

Embodiment 38: The apparatus of any of Embodiments 31, 32, 36, or 37, further comprising means for receiving a second indication that triggers the rate matching behavior.

Embodiment 39: The apparatus of Embodiment 38, wherein the second indication is received via radio resource control (RRC) signaling or via DCI signaling.

Embodiment 40: The apparatus of any of Embodiments 38 or 39, wherein the second indication triggers, as the rate matching behavior, one of: (i) performing rate-matching around the triggered set of ZP CSI-RS resources in each slot of the plurality of aggregated slots and (ii) performing rate-matching around the triggered set of ZP CSI-RS resources in only the first slot of the plurality of aggregated slots.

Embodiment 41: An apparatus for wireless communications, comprising: means for determining a rate matching behavior for processing a physical downlink shared channel (PDSCH); means for transmitting, to a user equipment (UE), a first indication via downlink control information (DCI) that triggers a set of zero power (ZP) channel state information reference signal (CSI-RS) resources from multiple sets of ZP CSI-RS resources, wherein the first indication is transmitted in a first slot of a plurality of aggregated slots; and means for transmitting the PDSCH in the first slot and at least a second slot, subsequent to the first slot, of the plurality of aggregated slots, wherein the determined rate matching behavior for processing the PDSCH transmitted in the first slot and at least the second slot is based in part on the first indication transmitted in the first slot.

Embodiment 42: The apparatus of Embodiment 41, wherein the rate matching behavior is to perform rate matching around the triggered set of ZP CSI-RS resources in each slot of the plurality of aggregated slots.

Embodiment 43: The apparatus of Embodiment 41, wherein the rate matching behavior is to perform rate matching around the triggered set of ZP CSI-RS resources in only the first slot of the plurality of aggregated slots.

Embodiment 44: The apparatus of Embodiment 41, further comprising means for transmitting a second indication triggering the UE to (i) perform rate matching around the triggered set of ZP CSI-RS resources in each slot of the plurality of aggregated slots when processing the transmitted PDSCH or (ii) perform rate matching around the triggered set of ZP CSI-RS resources in only the first slot of the plurality of aggregated slots when processing the transmitted PDSCH.

Embodiment 45: The apparatus of Embodiment 44, wherein the second indication is transmitted via radio resource control (RRC) signaling or DCI signaling.

Embodiment 46: A computer-readable medium having computer executable code stored thereon for wireless communication by a user equipment (UE), wherein the computer executable code includes: code for receiving, in a first slot of a plurality of aggregated slots, a first indication in downlink control information (DCI) that triggers a set of zero power (ZP) channel state information reference signal (CSI-RS) resources from multiple sets of ZP CSI-RS resources; code for determining, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots; and code for processing the PDSCH transmission received in the first slot and at least the second slot in accordance with the rate matching behavior.

Embodiment 47: The computer-readable medium of Embodiment 46, wherein the code for determining the rate matching behavior comprises code for determining in which slots of the plurality of aggregated slots, including the first slot and the second slot, to perform rate matching around the triggered set of ZP CSI-RS resources.

Embodiment 48: The computer-readable medium of any of Embodiments 46 or 47, wherein the computer executable code further comprises code for determining, based on the first indication received in the first slot, that the triggered set of ZP CSI-RS resources is associated with each slot of the plurality of aggregated slots, including the first slot and the second slot.

Embodiment 49: The computer-readable medium of any of Embodiments 46 to 48, wherein code for determining the rate matching behavior comprises code for determining to perform rate matching around the triggered set of ZP CSI-RS resources in each slot of the plurality of aggregated slots, including the first slot and the second slot.

Embodiment 50: The computer-readable medium of any of Embodiments 48 or 49, wherein the computer executable code further comprises code for receiving a second indication of at least one of a set of non-zero power (NZP) CSI-RS resources or a set of tracking reference signal (TRS) resources in at least one slot of the plurality of aggregated slots, wherein at least one of the set of NZP CSI-RS resources or the set of TRS resources overlaps the triggered set of ZP CSI-RS resources.

Embodiment 51: The computer-readable medium of any of Embodiments 46 or 47, wherein the computer executable code further comprises code for determining that the triggered set of ZP CSI-RS resources is associated with only the first slot.

Embodiment 52: The computer-readable medium of any of Embodiments 46, 47, or 51, wherein code for determining the rate matching behavior comprises code for determining to refrain from performing rate matching in at least the second slot.

Embodiment 53: The computer-readable medium of any of Embodiments 46, 47, 51, or 52, wherein the computer executable code further comprises code for receiving a second indication that triggers the rate matching behavior.

Embodiment 54: The computer-readable medium of Embodiment 53, wherein the second indication is received via radio resource control (RRC) signaling or via DCI signaling.

Embodiment 55: The computer-readable medium of any of Embodiments 53 or 54, wherein the second indication triggers, as the rate matching behavior, one of: (i) performing rate-matching around the triggered set of ZP CSI-RS resources in each slot of the plurality of aggregated slots and (ii) performing rate-matching around the triggered set of ZP CSI-RS resources in only the first slot of the plurality of aggregated slots.

Embodiment 56: A computer-readable medium having computer executable code stored thereon for wireless communication by a network entity, wherein the computer executable code includes: code for determining a rate matching behavior for processing a physical downlink shared channel (PDSCH); code for transmitting, to a user equipment (UE), a first indication via downlink control information (DCI) that triggers a set of zero power (ZP) channel state information reference signal (CSI-RS) resources from multiple sets of ZP CSI-RS resources, where the first indication is transmitted in a first slot of a plurality of aggregated slots; and code for transmitting the PDSCH in the first slot and at least a second slot, subsequent to the first slot, of the plurality of aggregated slots, where the determined rate matching behavior for processing the PDSCH transmitted in the first slot and at least the second slot is based in part on the first indication transmitted in the first slot.

Embodiment 57: The computer-readable medium of Embodiment 56, wherein the rate matching behavior is to perform rate matching around the triggered set of ZP CSI-RS resources in each slot of the plurality of aggregated slots.

Embodiment 58: The computer-readable medium of Embodiment 56, wherein the rate matching behavior is to perform rate matching around the triggered set of ZP CSI-RS resources in only the first slot of the plurality of aggregated slots.

Embodiment 59: The computer-readable medium of Embodiment 56, wherein the computer executable code further comprises code for transmitting a second indication triggering the UE to (i) perform rate matching around the triggered set of ZP CSI-RS resources in each slot of the plurality of aggregated slots when processing the transmitted PDSCH or (ii) perform rate matching around the triggered set of ZP CSI-RS resources in only the first slot of the plurality of aggregated slots when processing the transmitted PDSCH.

Embodiment 60: The computer-readable medium of Embodiment 59, wherein the second indication is transmitted via radio resource control (RRC) signaling or DCI signaling.

What is claimed is:

1. A method for wireless communication by a user equipment (UE), comprising:
   receiving, in a first slot of a plurality of aggregated slots, a first indication in downlink control information (DCI) that triggers a set of zero power (ZP) channel state information reference signal (CSI-RS) resources from multiple sets of ZP CSI-RS resources;
   determining, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots, wherein determining the rate matching behavior comprises determining that the triggered set of ZP CSI-RS resources in the first slot is associated with each slot of the plurality of aggregated slots, including the first slot and the second slot; and
   processing the PDSCH transmission received in the first slot and at least the second slot in accordance with the rate matching behavior.

2. The method of claim 1, wherein determining the rate matching behavior further comprises determining to perform rate matching around the triggered set of ZP CSI-RS resources in each slot of the plurality of aggregated slots, including the first slot and the second slot.

3. The method of claim 1, further comprising receiving a second indication of at least one of a set of non-zero power (NZP) CSI-RS resources or a set of tracking reference signal (TRS) resources in at least one of the plurality of aggregated slots, wherein at least one of the set of NZP CSI-RS resources or the set of TRS resources overlaps the triggered set of ZP CSI-RS resources.

4. The method of claim 1, further comprising receiving a second indication that triggers the rate matching behavior.

5. The method of claim 4, wherein the second indication is received via radio resource control (RRC) signaling or via DCI signaling.

6. The method of claim 4, wherein the second indication triggers, as the rate matching behavior, performing rate-matching around the triggered set of ZP CSI-RS resources in each slot of the plurality of aggregated slots.

7. An apparatus for wireless communications, comprising:
 a receiver configured to receive, in a first slot of a plurality of aggregated slots, a first indication in downlink control information (DCI) that triggers a set of zero power (ZP) channel state information reference signal (CSI-RS) resources from multiple sets of ZP CSI-RS resources;
 at least one processor configured to:
 determine, based at least in part on the first indication received in the first slot of the plurality of aggregated slots, a rate matching behavior for processing a physical downlink shared channel (PDSCH) transmission received in the first slot and at least a second slot, subsequent to the first slot, of the plurality of aggregated slots, wherein determining the rate matching behavior comprises determining that the triggered set of ZP CSI-RS resources in the first slot is associated with each slot of the plurality of aggregated slots, including the first slot and the second slot; and
 process the PDSCH transmission received in the first slot and at least the second slot in accordance with the rate matching behavior; and
 a memory coupled to the at least one processor.

8. The apparatus of claim 7, wherein the at least one processor is configured to determine to perform rate matching around the triggered set of ZP CSI-RS resources in each slot of the plurality of aggregated slots, including the first slot and the second slot.

9. The apparatus of claim 7, wherein:
 the receiver is further configured to receive a second indication of at least one of a set of non-zero power (NZP) CSI-RS resources or a set of tracking reference signal (TRS) resources in at least one of the plurality of aggregated slots; and
 at least one of the set of NZP CSI-RS resources or the set of TRS resources overlaps the triggered set of ZP CSI-RS resources.

10. The apparatus of claim 7, wherein the receiver is configured to receive a second indication that triggers the rate matching behavior.

11. The apparatus of claim 10, wherein the second indication is received via radio resource control (RRC) signaling or via DCI signaling.

12. The apparatus of claim 10, wherein the second indication triggers, as the rate matching behavior, performing rate-matching around the triggered set of ZP CSI-RS resources in each slot of the plurality of aggregated slots.

13. A method for wireless communication by a network entity, comprising:
 determining a rate matching behavior for processing a physical downlink shared channel (PDSCH);
 transmitting, to a user equipment (UE), a first indication via downlink control information (DCI) that triggers a set of zero power (ZP) channel state information reference signal (CSI-RS) resources from multiple sets of ZP CSI-RS resources, wherein the first indication is transmitted in a first slot of a plurality of aggregated slots; and
 transmitting the PDSCH in the first slot and at least a second slot, subsequent to the first slot, of the plurality of aggregated slots, wherein the determined rate matching behavior for processing the PDSCH transmitted in the first slot and at least the second slot is based in part on the first indication transmitted in the first slot and wherein the rate matching behavior is to perform rate matching around the triggered set of ZP CSI-RS resources in each slot of the plurality of aggregated slots.

14. The method of claim 13, further comprising transmitting a second indication triggering the UE to perform rate matching around the triggered set of ZP CSI-RS resources in each slot of the plurality of aggregated slots when processing the transmitted PDSCH.

15. The method of claim 14, wherein the second indication is transmitted via radio resource control (RRC) signaling or DCI signaling.

16. The method of claim 13, further comprising transmitting a second indication of at least one of a set of non-zero power (NZP) CSI-RS resources or a set of tracking reference signal (TRS) resources for at least one of the plurality of aggregated slots, wherein at least one of the set of NZP CSI-RS resources or the set of TRS resources overlaps the triggered set of ZP CSI-RS resources.

17. An apparatus for wireless communications, comprising:
 at least one processor configured to determine a rate matching behavior for processing a physical downlink shared channel (PDSCH);
 a transmitter configured to:
 transmit, to a user equipment (UE), a first indication via downlink control information (DCI) that triggers a set of zero power (ZP) channel state information reference signal (CSI-RS) resources from multiple sets of ZP CSI-RS resources, wherein the first indication is transmitted in a first slot of a plurality of aggregated slots; and
 transmit the PDSCH in the first slot and at least a second slot, subsequent to the first slot, of the plurality of aggregated slots, wherein the determined rate matching behavior for processing the PDSCH transmitted in the first slot and at least the second slot is based in part on the first indication transmitted in the first slot and wherein the rate matching behavior is to perform rate matching around the triggered set of ZP CSI-RS resources in each slot of the plurality of aggregated slots; and
 a memory coupled to the at least one processor.

18. The apparatus of claim 17, wherein the transmitter is further configured to transmit a second indication triggering the UE to perform rate matching around the triggered set of ZP CSI-RS resources in each slot of the plurality of aggregated slots when processing the transmitted PDSCH.

19. The apparatus of claim 18, wherein the second indication is transmitted via radio resource control (RRC) signaling or DCI signaling.

20. The apparatus of claim 17, wherein the transmitter is configured to transmit a second indication of at least one of a set of non-zero power (NZP) CSI-RS resources or a set of tracking reference signal (TRS) resources for at least one of the plurality of aggregated slots, wherein at least one of the set of NZP CSI-RS resources or the set of TRS resources overlaps the triggered set of ZP CSI-RS resources.

\* \* \* \* \*